United States Patent
Chen et al.

(10) Patent No.: US 7,545,818 B2
(45) Date of Patent: Jun. 9, 2009

(54) METHOD AND SYSTEM FOR DETECTING FACSIMILE COMMUNICATION DURING A VOIP SESSION

(75) Inventors: Zhihui Chen, Trabuco canyon, CA (US); Michael S. Beadle, Tustin, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1308 days.

(21) Appl. No.: 10/650,655

(22) Filed: Aug. 27, 2003

(65) Prior Publication Data

US 2005/0047422 A1    Mar. 3, 2005

(51) Int. Cl.
*H04N 1/10* (2006.01)
(52) U.S. Cl. .................... 370/401; 370/392; 370/395.52
(58) Field of Classification Search ................. 358/402, 358/407; 370/352, 356, 386, 401, 429, 465, 370/468; 379/100.12, 100.17; 709/204, 709/225, 230, 254; 726/22; 455/560
See application file for complete search history.

(56) References Cited

U.S. PATENT DOCUMENTS

| | | | |
|---|---|---|---|
| 6,463,135 B2 | 10/2002 | Abrishami et al. | |
| 6,697,776 B1 | 2/2004 | Fayad et al. | |
| 7,075,979 B2* | 7/2006 | Beadle et al. | 375/222 |
| 7,236,483 B2* | 6/2007 | Yeom | 370/352 |
| 7,359,370 B1* | 4/2008 | Renkel et al. | 370/352 |
| 2002/0001373 A1* | 1/2002 | Sakurai | 379/100.12 |
| 2002/0027926 A1* | 3/2002 | Tajiri et al. | 370/429 |
| 2003/0002476 A1* | 1/2003 | Chung et al. | 370/352 |
| 2003/0039248 A1* | 2/2003 | Weaver | 370/392 |
| 2003/0193696 A1* | 10/2003 | Walker et al. | 358/402 |
| 2005/0047422 A1* | 3/2005 | Chen et al. | 370/401 |

* cited by examiner

*Primary Examiner*—Hassan Kizou
*Assistant Examiner*—Lonnie Sweet
(74) *Attorney, Agent, or Firm*—Farjami & Farjami LLP (57) ABSTRACT

According to one aspect, a method of switching a first gateway from a voice mode to a facsimile mode comprises: configuring the first gateway to the voice mode for communication with a second gateway over a packet network, receiving a plurality of data packets from the second gateway over the packet network, analyzing one or more of the plurality of data packets, such as UDP packets, and configuring the first gateway to the facsimile mode if the analyzing determines that the one or more of the plurality of data packets carry facsimile data packets. The analyzing may include calculating a length of the UDP payload in accordance with UDPTL packet structure, and deciding the UDP payload includes a UDPTL packet if the calculated length is equal to UDP payload length, as indicated in the UDP header.

8 Claims, 7 Drawing Sheets

METHOD AND SYSTEM FOR DETECTING FACSIMILE COMMUNICATION DURING A VOIP SESSION

BACKGROUND OF THE INVENTION

1. Field of the Invention

The present invention relates generally to communications over packet networks. More particularly, the present invention relates to detecting facsimile communication during a voice over Internet Protocol ("VoIP") session.

2. Related Art

In recent years, packet-based networks, such as the Internet, have begun to replace the traditional analog telephone networks for transportation of voice and data. For example, with the emergence of VoIP, telephone conversations may now be captured, packetized and transported over the Internet. In a conventional VoIP system, telephone conversations or analog voice may be transported over the local loop or the public switched telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

Figure 1:
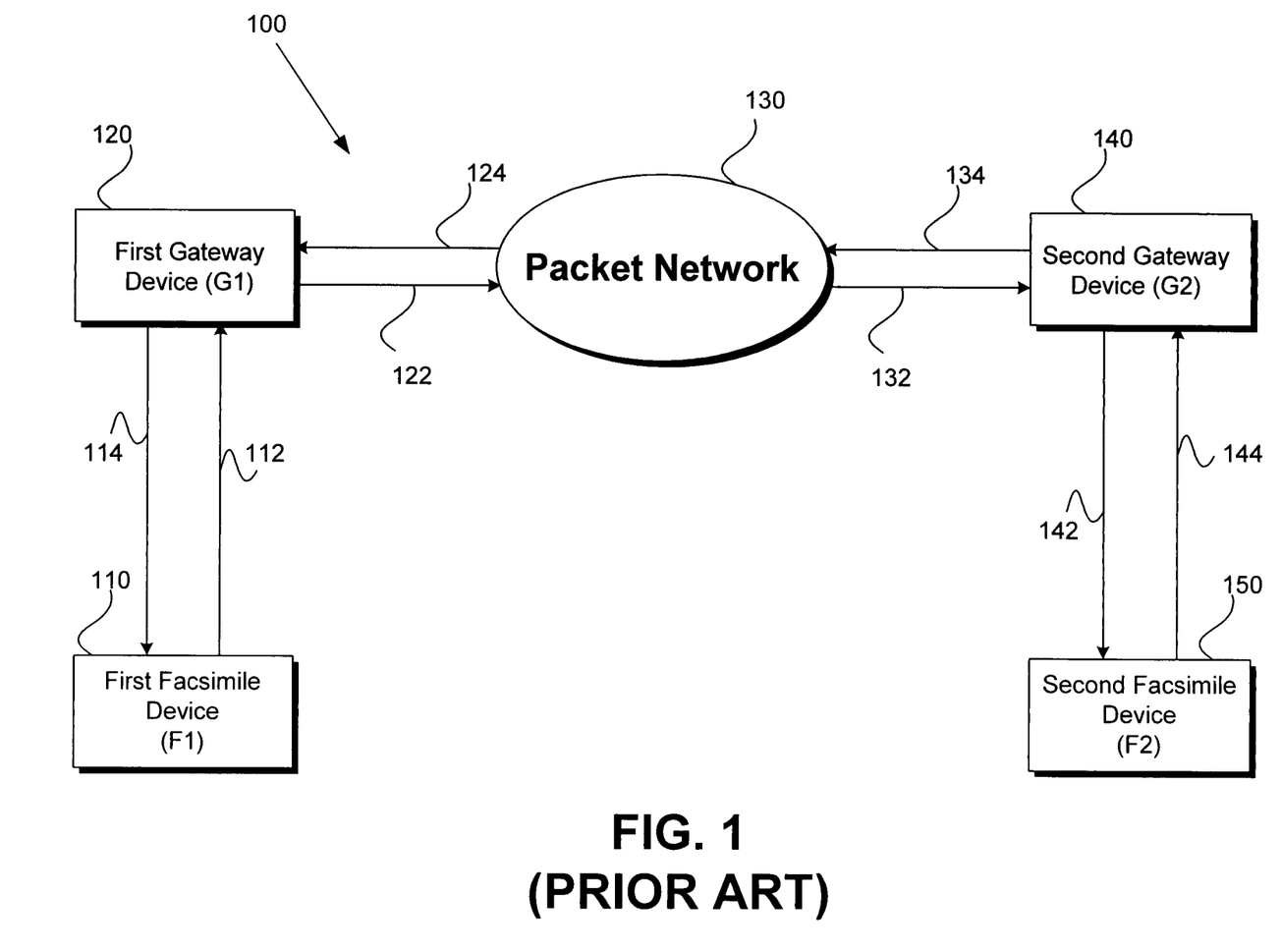
FIG. 1 illustrates a block diagram of a prior art communication model based on a packet network, such as the Internet, utilizing the Internet Protocol.

Today, many have diverted their focus to using the existing packet-based network and gateway devices, which have been designed to support the transportation of analog voice or speech over IP, to further support facsimile communication over IP, or as it is referred to in the industry, Facsimile over Internet Protocol ("FoIP"). FIG. 1 illustrates a block diagram of a conventional communication model for FoIP based on a packet-based network, such as the Internet. As shown, communication model 100 includes first facsimile device 110 in communication with first gateway device 120 over PSTN providing transmit and receive channels 112 and 114. Communication model 100 further includes second facsimile device 150 in communication with second gateway device 140 over PSTN providing transmit and receive channels 144 and 142. Communication model 100 enables communications between first gateway device 120 and second gateway device 140 via packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery and it is widely used for real-time voice and video transmissions where erroneous packets are not retransmitted. Voice packets may be transmitted as RTP (Transport Protocol for Real-Time Applications) packets, within UDP packets. RTP is described in the Network Working Group, Request for Comments ("RFC"): 1889, Audio-Video Transport Working Group, by Schulzrinne, et al. (January 1996), which is hereby incorporated by reference.

Conventionally, the communication process for FoIP begins when first facsimile device ("F1") 110 calls first gateway device ("G1") 120. As a result, G1 120 calls second gateway device ("G2") 140, and G2 140 in turn calls second facsimile device ("F2") 150. In order to support VoIP in their default mode of operation, typically, G1 120 and G2 140 communicate in voice mode and are configured to use a compressed voice protocol, such as the ITU standard G.723.1, G.711, etc. However, after F1 110 initiates the call, F1 110 begins to periodically transmit a facsimile calling tone, such as a tone with a frequency of 1,100 Hz, which is on for 0.5 second and off for 3 seconds. Upon detection and confirmation of the calling tone by G1 120, G1 120 informs G2 140 of the detection of a facsimile device, i.e. F1 110. At this point, G1 120 and G2 140 switch from voice mode (which is the default mode of operation, such as G.723.1, G.711, or the like) to facsimile mode of operation. In the facsimile mode of operation, G1 120 configures itself to communicate with F1 110, as a facsimile device. For example, G1 120 may support various facsimile modulations, such as ITU-T V.21 Channel 2, V.27ter, V.29, V.17, V.34, etc. As a result, G1 120 can negotiate an appropriate facsimile protocol with F1 110 and demodulate facsimile signals from F1 110 for transmission over packet network 130.

Further, G1 120 also configures itself to transmit the demodulated facsimile signals to G2 140 over packet network using a facsimile protocol over packet network, such as ITU-T T.38, which is described in the International Telecommunication Union publication, entitled "Procedures for Real-Time Group 3 Facsimile Communication Over IP Networks", dated June 1998, which is hereby incorporated by reference. As a result, rather than RTP packets—which are used to transport voice packets in the voice mode of operation—, UDPTL (User Datagram Protocol Transport Layer) packets are transported within UDP packets. UDPTL is a transport layer that is used on top of UDP to makes the delivery of packets more reliable by providing data redundancy.

Similar to G1 120, G2 140 also configures itself to communicate with G1 120 over packet network 130 according to the ITU-T T.38, and further to communicate with F2 150 using an appropriate facsimile protocol to modulate facsimile data from G1 120 for transmission to F2 150.

A key step in achieving the above-described communication link through G1 120 and G2 140 relies upon G1 120 notifying G2 140 of the detection of a facsimile device, such that both G1 120 and G2 140 timely switch from voice mode to facsimile mode. In the event that G2 140 fails to properly receive such facsimile notification from G1 120, G2 140 continues to remain in voice mode and the facsimile link will not be established.

Today, G1 120 transmits such facsimile notification to G2 140 through signaling channels, such as H.323, SIP or MEGACO. However, these signaling channels are proprietary and may not be supported by G2 140, unless both G1 120 and G2 140 are from the same manufacturer. As a result, the facsimile notifications may not be recognized by G2 140, which will lead to facsimile link failures.

Accordingly, there is a strong need in the art for reliable detection of facsimile communications over the packet network in order to avoid such facsimile link failures.

SUMMARY OF THE INVENTION

In accordance with the purpose of the present invention as broadly described herein, there is provided system and method for switching a first gateway from a voice mode to a facsimile mode. In one aspect of the present invention, a method for switching a first gateway from a voice mode to a facsimile mode comprises: configuring the first gateway to the voice mode for communication with a second gateway over a packet network, receiving a plurality of data packets from the second gateway over the packet network, analyzing one or more of the plurality of data packets to determine whether the one or more of the plurality of data packets carry facsimile data packets or voice data packets, and configuring the first gateway to the facsimile mode if the analyzing determines that the one or more of the plurality of data packets carry facsimile data packets.

In a further aspect, the voice data packets are RTP packets and the facsimile data packets are UDPTL packets, and IP/UDP packets encompass the RTP packets and the UDPTL packets. In one aspect, each UDP packet includes a UDP header and a UDP payload, the UDP header indicates a first length of the UDP payload, each UDPTL packet has a predetermined structure, and wherein the analyzing comprises: calculating a second length of the UDP payload in accordance with the predetermined structure of the UDPTL packet, and deciding the UDP payload includes the UDPTL packet if the first length is equal to the second length. In another aspect, calculating the second length comprises: writing zero to the second length, adding two to the second length for UDPTL sequence number field, adding one to the second length for UDPTL length of primary IFP field, reading UDPTL length of primary IFP from the UDPTL length of primary IFP field, adding the UDPTL length of primary IFP to the second length, adding one to the second length for UDPTL error recovery mechanism field, adding one to the second length for UDPTL number of secondary IFP field, reading UDPTL number of secondary IFP from UDPTL number of secondary IFP field, and adding, for each of the UDPTL number of secondary IFP, a length of UDPTL secondary IFP to the second length. In yet another aspect, the analyzing further comprises: comparing, prior to the calculating, an RTP type field within each UDP payload with a predetermined RTP type, and determining that the one or more of the plurality of data packets do not carry facsimile data packets if the RTP type field within each UDP payload does not match the predetermined RTP type.

In a separate aspect of the present invention, a method for use by a communication system for switching from a voice mode to a facsimile mode comprises: configuring a first gateway to the voice mode, configuring a second gateway to the voice mode, wherein the second gateway is in communication with the first gateway over a packet network. The method further comprises: receiving voice data by the first gateway, packetizing the voice data by the first gateway, in accordance with the voice mode, to generate data packets for transmission to the second gateway over the packet network, receiving a facsimile calling tone by the first gateway from a first facsimile device, configuring the first gateway to the facsimile mode from the voice mode, in response to the receiving the facsimile calling tone, receiving facsimile data by the first gateway from the first facsimile device, and packetizing the facsimile data by the first gateway, in accordance with the facsimile mode, to generate the data packets for transmission to the second gateway over the packet network, wherein the second gateway analyzes one or more of the data packets to determine whether the one or more of the data packets is packetized according to the voice mode or the facsimile mode, and wherein the second gateway switches from voice mode to facsimile mode if the second gateway determines that the one or more of the data packets is packetized according to the facsimile mode.

In other aspects, systems and devices of the present invention can perform one or more steps of the aforementioned methods.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other packet based communication networks and is not limited to modem over IP. Indeed, for the sake of brevity, conventional data transmission, tone generation and detection, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 2:
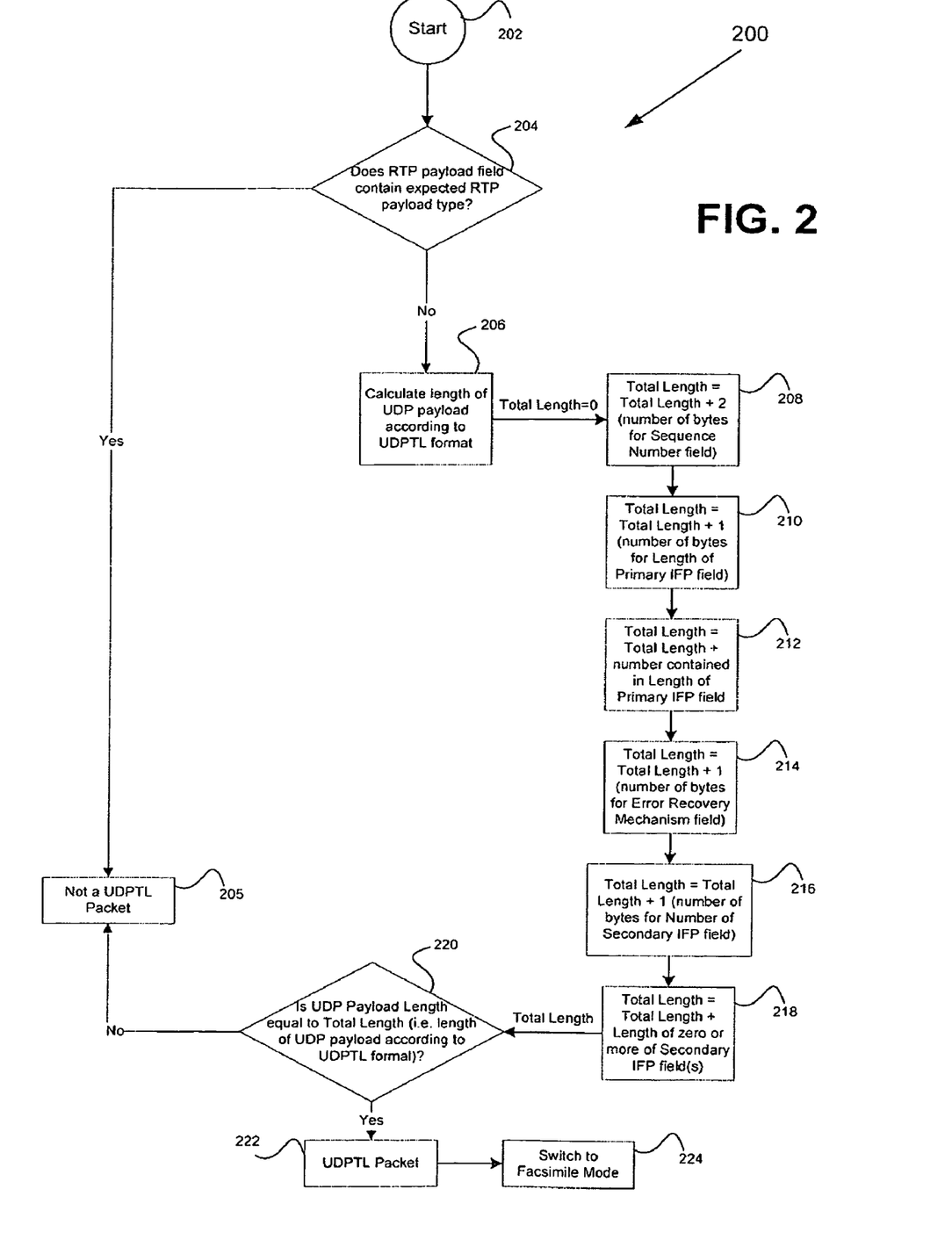
FIG. 2 illustrates a flow diagram for use by a gateway device to switch from voice mode to facsimile mode based on UDP payload, according to one embodiment of the present invention.

FIG. 2 illustrates flow diagram 200 for use by a gateway device to switch from voice mode to facsimile mode based on UDP payload, according to one embodiment of the present invention. As described above, after F1 110 initiates a call to G1 120, F1 sends a facsimile calling tone, which indicates to G1 120 that F1 110 is a facsimile device. Upon detection and confirmation of the facsimile calling tone by G1 120, G1 120 switches from voice mode to facsimile mode. As a result, UDP payload of IP/UDP packets will start carrying UDPTL packets rather than RTP packets. In one embodiment of the present invention, flow diagram 200 can be implemented by G2 140 to detect when G1 120 switches to facsimile mode based on a recognition that IP/UDP packets contain UDPTL packets rather than RTP packets.

Figure 3:
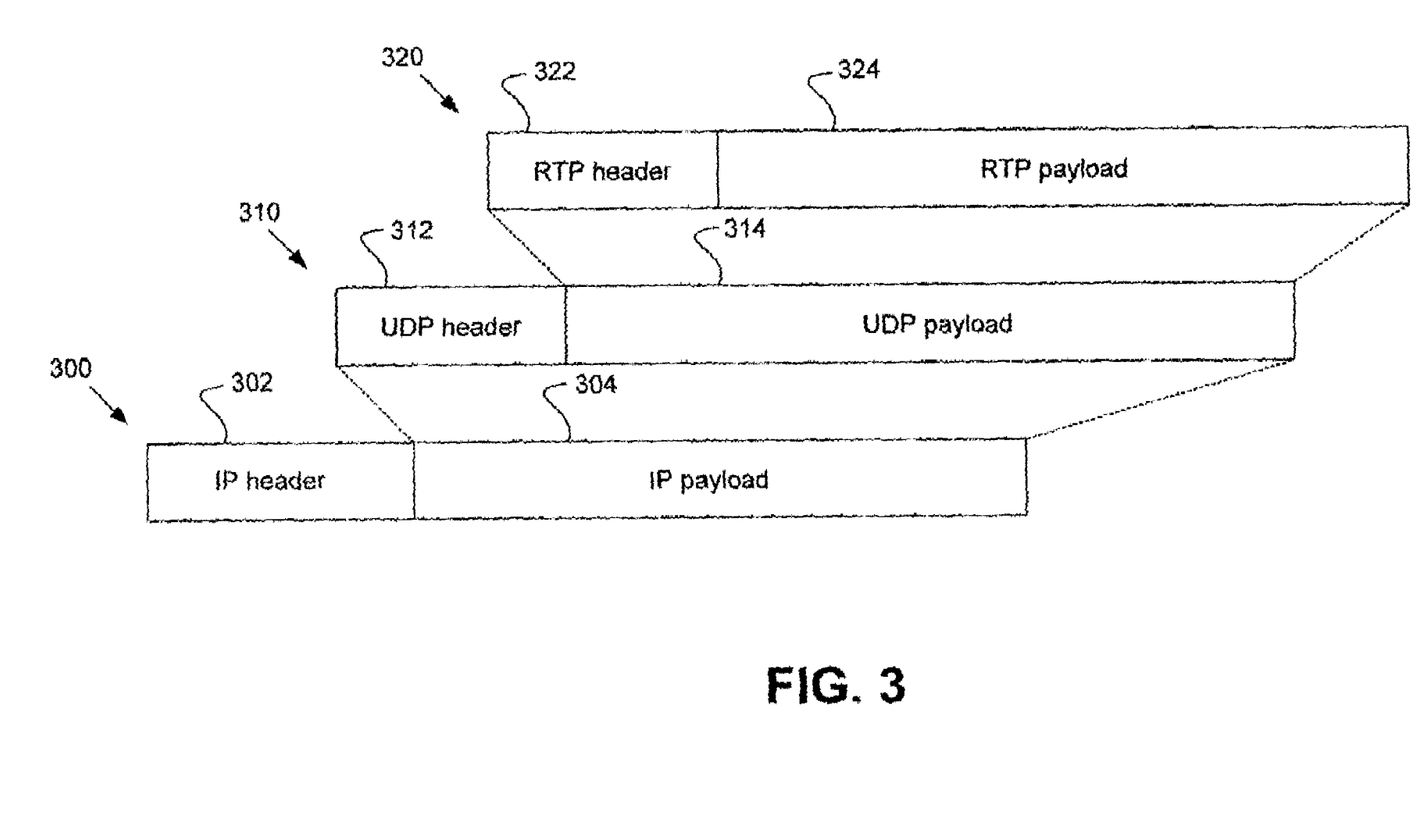
FIG. 3 illustrates a high-level IP/UDP/RTP packet structure.

As shown in FIG. 3, IP packet 300 includes IP header 302 and IP payload 304. Further, in case of an IP/UDP packet, IP payload 302 encompasses UDP packet 310, which includes UDP header 312 and UDP payload 314. As further shown in FIG. 3, in case of an IP/UDP/RTP packet, UDP payload 312 encompasses RTP packet 320, which includes RTP header 322 and RTP payload 324. As discussed above, IP/UDP/RTP packets are used for transmission of voice packets, such as voice packets created according to G.723.1, G.711, or the like, by G1 120 to G2 140 over IP network 130.

Figure 4:
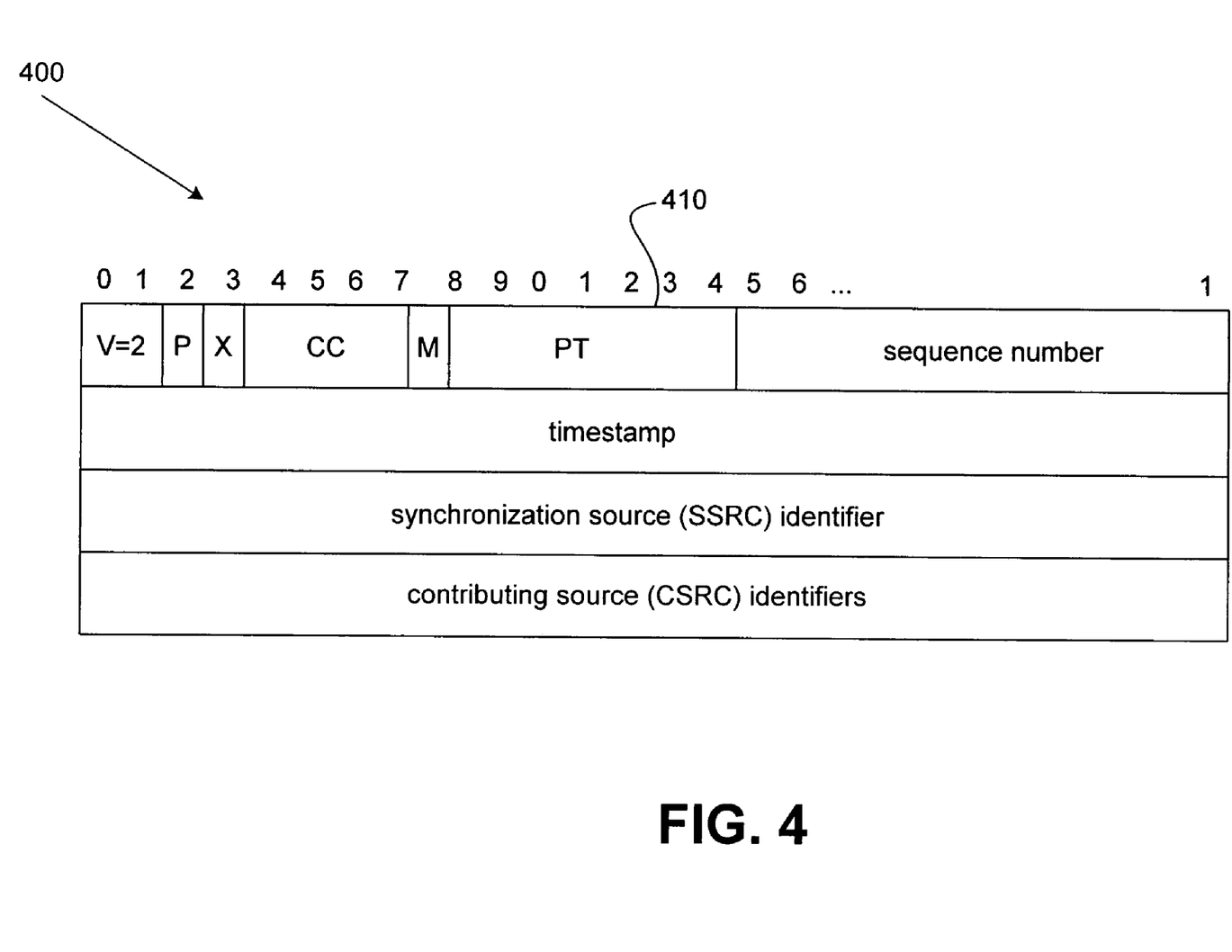
FIG. 4 illustrates an RTP packet structure.

Turning back to FIG. 2, flow diagram 200 processes each IP/UDP packet, which G2 140 receives from G1 120, while G2 140 is in voice mode. As shown, flow diagram 200 starts at step 202 and moves to step 204, where it is determined whether the RTP payload field—assuming the UDP payload includes an RTP packet—contains the expected RTP payload type. It should be noted that the RTP payload type is determined in the process of configuring G1 120 and G2 140 for voice mode, and the RTP payload type is already known at step 204. FIG. 4 also illustrates RTP packet structure 400, where PT field 410 includes the RTP payload type. Accordingly, if at step 204, PT field 410 contains the expected RTP payload type, flow diagram 200 moves to step 205 to indicate that the IP/UDP packet is not a UDPTL packet.

In some embodiments, flow diagram 200 may not move immediately from step 204 to step 205 upon the determination that PT field 410 includes the RTP payload type, rather, flow diagram 200 may perform additional steps (not shown) to confirm that the UDP payload includes an RTP packet. For example, in some cases, it may be determined whether UDP payload 314 length matches the expected RTP packet length. Since the RTP packet length is determined in the process of configuring G1 120 and G2 140 for voice mode, the RTP packet length is already known. Accordingly, in one embodiment, if UDP payload 314 length does not match the expected RTP packet length, flow diagram 200 moves to step 206 instead of step 205. In yet another embodiment, the synchronization source (or SSRC) in the RTP header may be checked against the expected synchronization source, and if there is no match, flow diagram 200 moves to step 206 instead of step 205.

Figure 5:
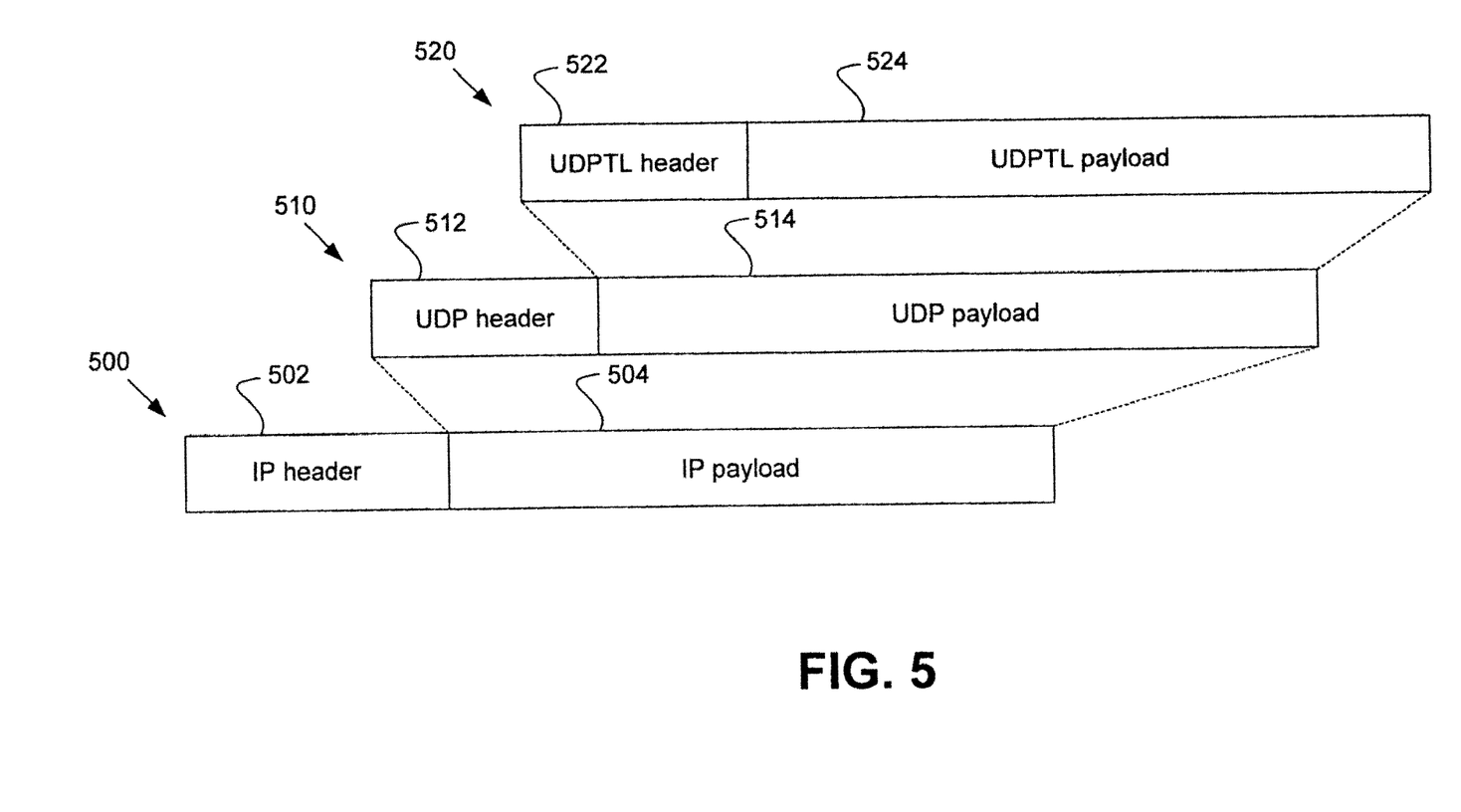
FIG. 5 illustrates a high-level IP/UDP/UDPTL packet structure.

Turning back to step 204, as shown in flow diagram 200, if it is determined that PT field 410 does not contain the expected RTP payload type, flow diagram 200 moves to step 206 to calculate length of the UDP payload according to the UDPTL packet structure. FIG. 5 illustrates the structure of an IP/UDP/UDPTL packet, wherein IP packet 500 includes IP header 502 and IP payload 504. Further, in case of an IP/UDP packet, IP payload 502 encompasses UDP packet 510, which includes UDP header 512 and UDP payload 514. As further shown in FIG. 5, in case of an IP/UDP/UDPTL packet, UDP payload 512 encompasses UDPTL packet 520, which includes UDPTL header 522 and UDPTL payload 524. As discussed above, IP/UDP/UDPTL packets are used for transmission T.38 facsimile packets by G1 120 to G2 140 over IP network 130.

Figure 6:
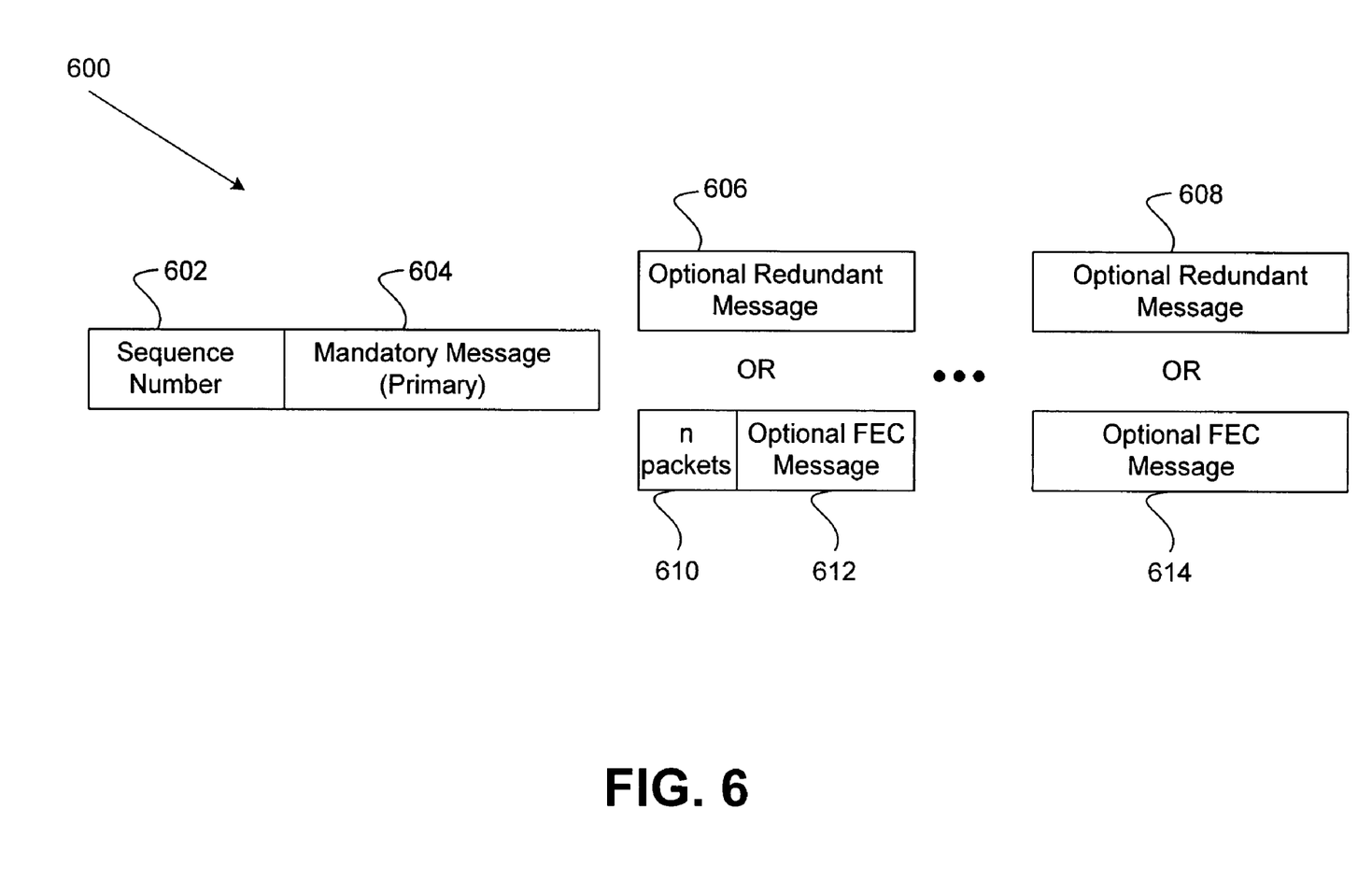
FIG. 6 illustrates a UDPTL packet structure.

Assuming that UDP payload 514 includes UDPTL packet 520, length of UDPTL packet 520 is calculated at steps 208-218, according to the structure of UDPTL packet 600, as shown in FIG. 6. FIG. 6 specifies the order in which different messages are assembled into UDPTL packet 600. It should be noted that it is invalid to transmit both redundant fields 606 and 608, and FEC fields 610, 612 and 614 within the same UDPTL packet.

At step 208, the first two bytes of UDP payload 514 are assumed to contain sequence number 602, and are added to the total length, i.e. total length=0+2=2. Next, at step 210, the third byte of UDP payload 514 is assumed to contain length of the primary Internet facsimile protocol ("IFP") field within mandatory message 604, and is added to the total length, i.e. total length=2+1=3. At step 212, the contents of the third byte of UDP payload 514, i.e. length of the primary IFP field is added to the total length, i.e. total length=3+UDP payload [3]. Next, at step 214, a UDP payload 514 byte for the error recovery mechanism field is added to the total length, i.e. total length=3+UDP payload [3]+1=4+UDP payload [3]. Further, at step 216, UDP payload 514 byte appearing at position 3+UDP payload [3]+2 is assumed to contain the number of secondary IFP(s) (or sec_num), and is added to the total length, i.e. total length=4+UDP payload [3]+1=5+UDP payload [3]. Lastly, at step 218, the length of each secondary IFP(s) (or sec_len), if any, is added to total length, i.e. total length=5+UDP payload [3]+$\Sigma_{i=0 \ to \ sec\_num}$ (1+sec_len[i]). At the end of step 218, the calculated total length represents the length of UDPTL packet 520, assuming UDP payload 514 encompasses such packet.

After calculating the total length of UDP payload according to the UDPTL packet structure 600, flow diagram 200 moves to step 220. At step 220, it is determined whether the UDP payload length, as indicated in UDP header 512, is equal to the calculated total length, as determined by steps 208-218. If so, UDP payload 514 matches UDPTL packet structure 600, and flow diagram 200 moves to step 222, where UDP payload 514 is recognized as a UDPTL packet. At this point, G2 140 recognizes that G1 120 has switched from voice mode (RTP packets) to facsimile mode (UDPTL packets). Accordingly, at step 224, G2 140 switches to facsimile mode and configures itself to communicate with G1 120 according to the T.38 standard, and further negotiate with F2 150 according to the facsimile standard to select a facsimile mode, such as V.27ter, V.29, V.17, V.34, etc.

However, if, at step 220, it is determined that the UDP payload length, as indicated in UDP header 512, is not equal to the total length, as determined by steps 208-218, flow diagram 200 moves to step 205, where it is recognized that UDP payload 514 is not a UDPTL packet, and G2 140 remains in voice mode.

In some embodiments of the present invention, steps 202 and 204 may be skipped, and for each UDP packet 510, length of UDP payload 514 is determined in accordance with steps 208-218, and then checked at step 220 to determine whether UDP payload 514 carries UDPTL packet 520. Steps 202 and 204 can be implemented to avoid the overhead cycle of steps 208-220 for all voice packets. Further, in other embodiments, one of step 202 and step 204 may be skipped.

As shown in the above-described embodiments, by distinguishing between voice packets, such as RTP packets, and facsimile packets, such as UDPTL packets, the present invention enables G2 140 to detect when G1 120 switches from voice mode to facsimile mode, whether or not G1 120 transmits a facsimile notification to G2 140, or whether or not such facsimile notification is recognized by G2 140. Accordingly, facsimile communication may be facilitated more reliably and efficiently over packet networks.

Figure 7:
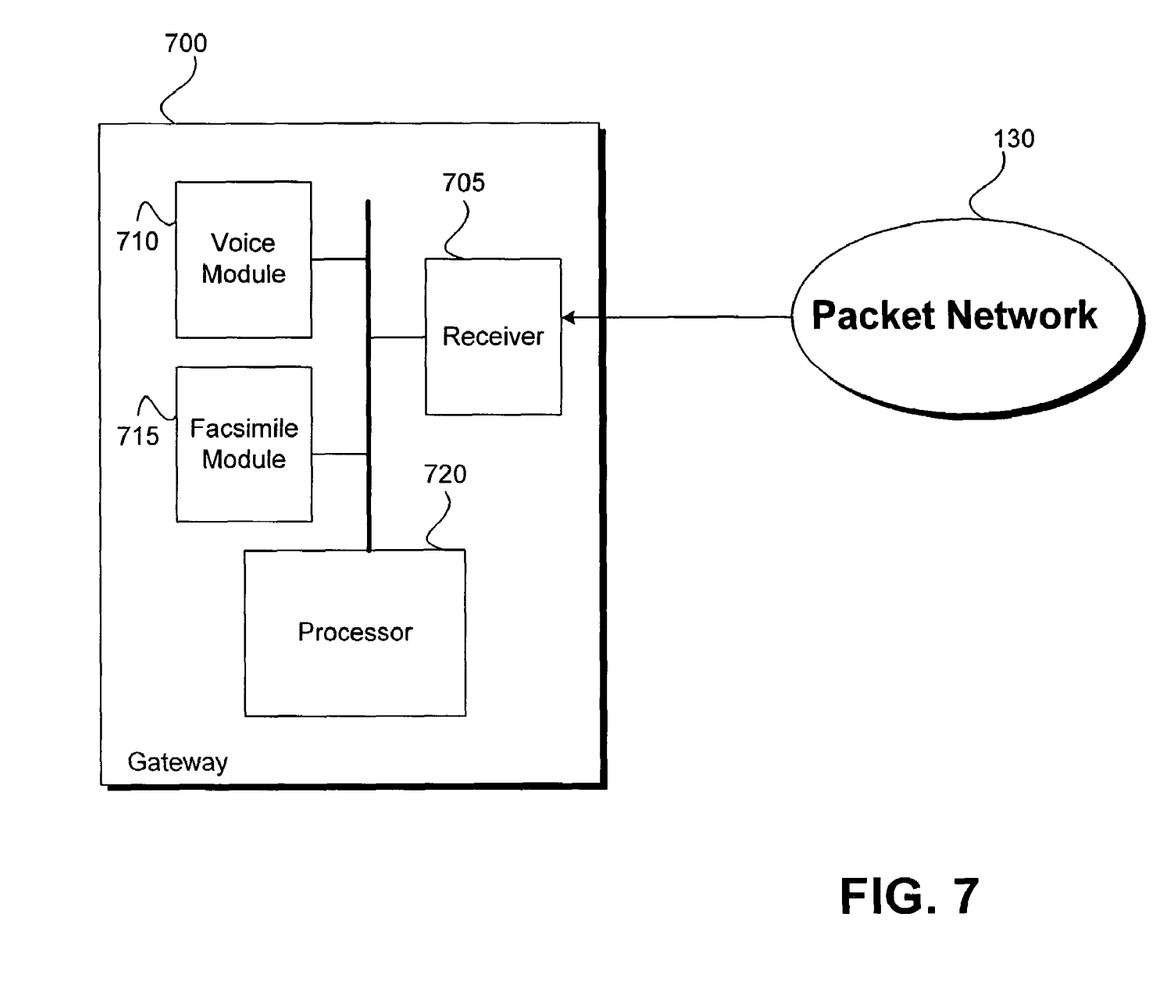
FIG. 7 illustrates a block diagram of a gateway device.

FIG. 7 illustrates a block diagram of gateway device 700, such as G2 140. As shown, in one embodiment, G2 140 includes receiver 705 for receiving IP/UDP packets from G1 120 over packet network 130. While G2 140 is in voice mode of operation, processor 720 analyzes the IP/UDP packets to determine whether one or more of the IP/UDP packets include facsimile packets, such as UDPTL packets. If processor 720 determines that the IP/UDP packets include facsimile packets, processor 720 configures G2 140 for facsimile mode and provides IP/UDP packets to facsimile module 715 for processing, otherwise G2 140 remains in voice mode and processor 720 provides IP/UDP packets to voice module 715 for processing. In one embodiment, processor 720 uses the method of flow diagram 200 to determine whether the IP/UDP packets include facsimile packets. Further, in one embodiment, voice module 710 is capable of processing the IP/UDP packets to retrieve RTP packets and process the RTP packets according to various voice coding techniques or standards, such as G.711, G.723.1, and the like. In addition, in one embodiment, facsimile module 715 is capable of processing the IP/UDP packets to retrieve UDPTL packets and process the UDPTL packets according to various techniques or standards, such as ITU-T T.38 standard, and the like.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of switching a first gateway from a voice mode to a facsimile mode, said method comprising:
    configuring said first gateway to said voice mode for communication with a second gateway over a packet network;
    receiving a plurality of UDP data packets from said second gateway over said packet network;
    analyzing one or more of said plurality of UDP data packets to determine whether said one or more of said plurality of UDP data packets carry facsimile UDPTL data packets or voice RTP data packets, wherein said analyzing includes comparing an RTP type field within each UDP payload with a predetermined RTP type, and determining that said one or more of said plurality of UDP data packets do not carry facsimile UDPTL data packets if said RTP type field within each UDP payload does not match said predetermined RTP type; and
    configuring said first gateway to said facsimile mode if said analyzing determines that said one of more of said plurality of UDP data packets carry facsimile UDPTL data packets;
    wherein each UDP packet includes a UDP header and a UDP payload, said UDP header indicates a first length of said UDP payload, each UDPTL packet has a predetermined structure, and wherein said analyzing comprises:
    calculating a second length of said UDP payload in accordance with said predetermined structure of said UDPTL packet; and
    deciding said UDP payload includes said UDPTL packet if said first length is equal to said second length.

2. The method of claim 1, wherein said calculating said second length comprises:
    writing zero to said second length;
    adding two to said second length for UDPTL sequence number field;
    adding one to said second length for UDPTL length of primary IFP field;
    reading UDPTL length of primary IFP from said UDPTL length of primary IFP field;
    adding said UDPTL length of primary IFP to said second length;
    adding one to said second length for UDPTL error recovery mechanism field;
    adding one to said second length for UDPTL number of secondary IFP field;
    reading UDPTL number of secondary IFP from UDPTL number of secondary IFP field; and
    adding, for each of said UDPTL number of secondary IFP, a length of UDPTL secondary IFP to said second length.

3. A first gateway in communication with a second gateway over a packet network, said first gateway comprising:
    a receiver configured to receive a plurality of UDP data packets from said second gateway over said packet network;
    a voice module configured to receive said plurality of UDP data packets, if said first gateway is in a voice mode, to retrieve voice packets within said plurality of UDP data packets;
    a facsimile module configured to receive said plurality of UDP data packets, if said first gateway is in a facsimile mode, to retrieve facsimile packets within said plurality of UDP data packets; and
    a processor configured to analyze one or more of said plurality of UDP data packets, when said first gateway is in said voice mode, to determine whether said one or more of said plurality of UDP data packets carry facsimile UDPTL data packets or voice RTP data packets, wherein said processor analyzes said one or more of said plurality of UDP data packets by comparing an RTP type field within each UDP payload with a predetermined RTP type, and said processor determines that said one or more of said plurality of UDP data packets do not carry facsimile UDPTL data packets if said RTP type field within each UDP payload does not match said predetermined RTP type;
    wherein, when said first gateway is in said voice mode, said processor configures said first gateway to said facsimile mode if said processor determines said one or more of said plurality of UDP data packets carry facsimile UDPTL data packets;
    wherein each UDP packet includes a UDP header and a UDP payload, said UDP header indicates a first length of said UDP payload, each UDPTL packet has a predetermined structure, and wherein said processor determines said one or more of said plurality of UDP data packets carry facsimile UDPTL data packets by calculating a second length of said UDP payload in accordance with said predetermined structure of said UDPTL packet, and decides said UDP payload includes said UDPTL packet if said first length is equal to said second length.

4. The first gateway of claim 3, wherein said processor calculates said second length by writing zero to said second length, adding two to said second length for UDPTL sequence number field, adding one to said second length for UDPTL length of primary IFP field, reading UDPTL length of primary IFP from said UDPTL length of primary IFP field, adding said UDPTL length of primary IFP to said second length, adding one to said second length for UDPTL error recovery mechanism field, adding one to said second length for UDPTL number of secondary IFP field, reading UDPTL number of secondary IFP from UDPTL number of secondary IFP field, and adding, for each of said UDPTL number of secondary IFP, a length of UDPTL secondary IFP to said second length.

5. A method for use by a communication system for switching from a voice mode to a facsimile mode, said method comprising:

configuring a first gateway to said voice mode;

configuring a second gateway to said voice mode, wherein said second gateway is in communication with said first gateway over a packet network;

receiving voice data by said first gateway;

packetizing said voice data by said first gateway, in accordance with said voice mode, to generate UDP data packets for transmission to said second gateway over said packet network;

receiving a facsimile calling tone by said first gateway from a first facsimile device;

configuring said first gateway to said facsimile mode from said voice mode, in response to said receiving said facsimile calling tone;

receiving facsimile data by said first gateway from said first facsimile device; and packetizing said facsimile data by said first gateway, in accordance with said facsimile mode, to generate said UDP data packets for transmission to said second gateway over said packet network;

wherein said second gateway analyzes one or more of said UDP data packets to determine whether said one or more of said UDP data packets is packetized according to said voice mode or said facsimile mode by comparing an RTP type field within each UDP payload with a predetermined RTP type, and said second gateway determines that said one or more of said plurality of UDP data packets do not carry facsimile UDPTL data packets if said RTP type field within each UDP payload does not match said predetermined RTP type, and wherein said second gateway switches from voice mode to facsimile mode if said second gateway determines that said or more of said UDP data packets is packetized according to said facsimile mode;

wherein said UDP data packets packetized in accordance with said voice mode are RTP packets and said UDP data packets packetized in accordance with said facsimile mode are UDPTL packets, and wherein said UDP data packets encompass said RTP packets and said UDPTL packets;

wherein each UDP packet includes a UDP header and a UDP payload, said UDP header indicates a first length of said UDP payload, each UDPTL packet has a predetermined structure, and wherein said second gateway analyzes each of said one or more of said UDP data packets by calculating a second length of said UDP payload in accordance with said predetermined structure of said UDPTL packet, and determines said UDP payload includes said UDPTL packet if said first length is equal to said second length.

6. The method of claim 5, wherein said calculating said second length comprises:

writing zero to said second length;

adding two to said second length for UDPTL sequence number field;

adding one to said second length for UDPTL length of primary IFP field;

reading UDPTL length of primary IFP from said UDPTL length of primary IFP field;

adding said UDPTL length of primary IFP to said second length;

adding one to said second length for UDPTL error recovery mechanism field;

adding one to said second length for UDPTL number of secondary IFP field;

reading UDPTL number of secondary IFP from UDPTL number of secondary IFP field; and adding, for each of said UDPTL number of secondary IFP, a length of UDPTL secondary IFP to said second length.

7. A communication system comprising:

a first gateway having a facsimile mode and a voice mode, said first gateway including:

a receiver configured to receive voice data;

a processor configured to packetize said voice data, in accordance with said voice mode, to generate UDP data packets for transmission to said second gateway over a packet network, wherein said processor detects a facsimile calling tone from a first facsimile device and configures said first gateway to said facsimile mode from said voice mode, in response to said facsimile calling tone, and wherein said processor packetizes said facsimile data, in accordance with said facsimile mode, to generate said UDP data packets for transmission to said second gateway over said packet network; and a second gateway having a facsimile mode and a voice mode, said second gateway including:

a receiver configured to receive said UDP data packets from said first gateway over said packet network;

a voice module configured to receive said plurality of UDP data packets, if said first gateway is in said voice mode, to retrieve voice packets within said plurality of UDP data packets;

a facsimile module configured to receive said plurality of UDP data packets, if said first gateway is in said facsimile mode, to retrieve facsimile packets within said plurality of UDP data packets; and a processor configured to analyze one or more of said UDP data packets to determine whether said one or more of said UDP data packets is packetized according to said voice mode or said facsimile mode, wherein said processor of said second gateway analyzes said one or more of said plurality of UDP data packets by comparing an RTP type field within each UDP payload with a predetermined RTP type, and said processor of said second gateway determines that said one or more of said plurality of UDP data packets do not carry facsimile UDPTL data packets if said RTP type field within each UDP payload does not match said predetermined RTP type, and wherein said processor switches said second gateway from said voice mode to said facsimile mode if said processor determines that said one or more of said UDP data packets is packetized according to said facsimile mode;

wherein said UDP data packets packetized in accordance with said voice mode are RTP packets and said UDP data packets packetized in accordance with said facsimile mode are UDPTL packets, and wherein said UDP data packets encompass said RTP packets and said UDPTL packets;

wherein each UDP packet includes a UDP header and a UDP payload, said UDP header indicates a first length of said UDP payload, each UDPTL packet has a predetermined structure, and wherein said second gateway analyzes each of said one or more of said UDP data packets by calculating a second length of said UDP payload in accordance with said predetermined structure of said UDPTL packet, and determines said UDP payload includes said UDPTL packet if said first length is equal to said second length.

8. The communication system of claim 7, wherein said processor of said second gateway calculates said second length by writing zero to said second length, adding two to said second length for UDPTL sequence number field, adding one to said second length for UDPTL length of primary IFP field, reading UDPTL length of primary IFP from said UDPTL length of primary IFP field, adding said UDPTL length of primary IFP to said second length, adding one to said second length for UDPTL error recovery mechanism field, adding one to said second length for UDPTL number of secondary IFP field, reading UDPTL number of secondary IFP from UDPTL number of secondary IFP field, and adding, for each of said UDPTL number of secondary IFP, a length of UDPTL secondary IFP to said second length.

* * * * *